United States Patent [19]
Baumann et al.

[11] 3,878,143
[45] Apr. 15, 1975

[54] METHOD OF PREVENTING CORROSION IN CONNECTION WITH EXTRUSION OF MIXTURES CONTAINING POLYVINYL CHLORIDE AND WOOD FLOUR OR SIMILAR CELLULOSIC MATERIAL, AND ANALOGOUS MIXTURES CONTAINING POLYSTYRENE OR ACRYLONITRILE-BUTADIENE-STYRENE RESIN, RESPECTIVELY

[75] Inventors: Hans Baumann, Astorp; Agu Kriisa; Hans Erik Grahn, both of Malmo, all of Sweden

[73] Assignee: Sonesson Plast AB, Malmo, Sweden

[22] Filed: Oct. 31, 1973

[21] Appl. No.: 411,509

[30] Foreign Application Priority Data
Nov. 3, 1972 Sweden.............................. 14242/72

[52] U.S. Cl..................... 260/17.4 R; 260/17.4 BB; 260/17.4 CL; 264/83; 264/211
[51] Int. Cl. .............................................. C08f 45/18
[58] Field of Search. 260/17.4 R, 17.4 CL, 17.4 BB; 264/83

[56] References Cited
UNITED STATES PATENTS

| | | | |
|---|---|---|---|
| 1,966,856 | 7/1934 | Groff................................. | 260/45.9 |
| 2,103,581 | 12/1937 | Gray.................... | 260/45.9 |
| 2,365,400 | 12/1944 | Fikentscher.................... | 260/17.4 R |
| 2,993,022 | 7/1961 | Coler ............................ | 260/17.4 R |

FOREIGN PATENTS OR APPLICATIONS
549,992   5/1954   Canada............................. 260/17.4

*Primary Examiner*—James H. Derrington

[57] ABSTRACT

The invention provides a method of preventing corrosion and wear caused by corrosion in connection with extrusion of a mixture containing polyvinyl chloride and wood flour or similar cellulosic material and analogous mixtures with polystyrene or acrylonitrile-butadiene-styrene resin, respectively. In order to neutralize acidic gaseous matter originating from the cellulosic material contained in the mixture, the extrusion is effected in the presence of at least one gaseous alkaline compound.

7 Claims, No Drawings

METHOD OF PREVENTING CORROSION IN CONNECTION WITH EXTRUSION OF MIXTURES CONTAINING POLYVINYL CHLORIDE AND WOOD FLOUR OR SIMILAR CELLULOSIC MATERIAL, AND ANALOGOUS MIXTURES CONTAINING POLYSTYRENE OR ACRYLONITRILE-BUTADIENE-STYRENE RESIN, RESPECTIVELY

In connection with extrusion or injection moulding of polyvinyl chloride at a temperature of 150°–200°C there is bound to be certain dissociation of gaseous hydrogen chloride which may cause corrosion on the inner surfaces of the extruder or the injection machine unless preventive measures are taken. Below these surfaces will be termed the working surfaces of the machine. This preventive measure consists in neutralization of the gaseous hydrogen chloride within the melt extruded or injected by adding alkaline substances (stabilizers) which are practically not volatile at the prevailing temperature, such as chalk, metal oxides, metallic soaps, and several other substances known to be suited for this purpose. In this connection it should be stressed that the dissociation of hydrogen chloride and the subsequent neutralization due to the additives is effected homogeneously within the melt.

Mixtures of polyvinyl chloride and a substantial quantity of cellulosic powder such as wood flour, shell flour or the like — below such mixtures will generally be referred to as "mixture" — are nowadays attracting ever increasing technological interest. This is also true of analogous mixtures containing polystyrene or acrylonitrile-butadiene-styrene resin (ABS resin) instead. The physical properties of the mixtures are, in fact, more advantageous in several respects than the properties of pure polyvinyl chloride, polystyrene, and ABS resin, respectively. For instance the mixtures have lower thermal expansion and lesser deformation when subjected to long-term loads than pure polyvinyl chloride, polystyrene or ABS resin. Despite these advantages, extruded or injected objects made of these mixtures are not yet manufactured on any considerable scale, the most plausible reason for this being the heavy corrosion and the resulting wear in connection with extrusion or injection moulding of the mixtures.

So far it has been assumed, quite correctly, that the corrosion may have two sources:

a. The existence of greater friction between the wood particles which are much stiffer than e.g. pure polyvinyl chloride, and the working surfaces than between the rest of the melt and the working surfaces. The extrusion pressure, particularly near the forming die, is rather high and of a magnitude of 200–300 kp/cm$^2$.

b. The existence of volatile acids originating from the wood. Under certain temperature conditions wood will emit small quantities of weak organic acids, whereby especially acetic acid is formed, if the temperature is so high that thermal degradation will occur. The thermal degradation of wood within a temperature range of 150°–200°C is still very weak.

In the light of previous experience in the field there has been found no reason for assuming other than that the neutralization of "wood acids" formed one way or another would be achieved by the same means and in the same efficient manner as the neutralization of the hydrogen chloride and the hydrochloric acid resulting therefrom. The reason for the high corrosion in connection with extrusion or injection moulding of mixtures has therefore been assumed to lie in the resulting greater friction according to (a) above.

The present invention bases on the insight that, surprisingly enough, it is nevertheless the acidic gaseous dissociated matter from the wood that causes said heavy corrosion of the working surfaces. It has furthermore become evident that this acidic dissociated matter cannot be neutralized in a conventional way, i.e. by adding nonvolatile alkaline substances, even if these substances are overdosed.

Referring to this experience the invention relates to a method of preventing corrosion in connection with extrusion of a mixture containing polyvinyl chloride and wood flour or similar cellulosic material, and analogous mixtures of polystyrene or acrylonitrile-butadiene-styrene resin (ABS resin), respectively, said method being characterized in that, in order to neutralize acidic, gaseous matter originating from the cellulosic material of the mixture, the extrusion is effected in the presence of at least one gaseous alkaline compound.

The method according to the invention is illustrated by a number of examples which will be described below.

EXAMPLE 1

A melt of pure polyvinyl chloride (i.e. without wood flour or the like) with conventional additives or neutralizers (stabilizers) was extruded at a temperature of 170°C. The melt had the following composition:

| | |
|---|---|
| PVC | 100 parts by weight |
| Pb-stearate | 2 parts by weight |
| Ca-stearate | 1 part by weight |
| Chalk | 5 parts by weight |

The melt thus contained only non-volatile neutralizers (stabilizers). Near the die where the strand leaves the extruder there was provided a water-cooling surface. After a few minutes a small quantity of condensate was formed which was subjected to a test with pH paper whereby it was established that the condensate was practically neutral. This example thus illustrates the well-known trivial measure of neutralizing hydrogen chloride dissociated in connection with the extrusion.

EXAMPLE 2

To the melt according to example 1, 50 parts by weight of wood flour were added and the test was repeated under the same conditions as for the rest. At a test with pH paper a pH value of 3 was obtained.

EXAMPLE 3

To the mixture in example 2, 5 parts by weight of trisodium phosphate were added whereby the mixture, when leaving the extruder turned heavily alkaline; by extractive boiling 1 part of the mixture with 2 parts of water a pH value of about 10 was obtained. The condensate gathered at the die still had, however, a pH value of 3.

EXAMPLE 4

To the mixture in example 2, 0.5 parts by weight of urea were added. The condensate gathered at the die now proved to be alkaline.

EXAMPLE 5

| | |
|---|---|
| Polystyrene | 100 parts by weight |
| Wood flour | 50 parts by weight |
| Urea | 0.5 parts by weight |

The condensate proved alkaline. Without the addition of urea the condensate provided acidic, with a pH value of 3.

Examples 4 and 5 have made it possible to establish that the use of one of the additives in the table below in the mixture according to example 2 in all cases will yield an alkaline condensate at the die:

| Substance | Parts by weight | Boiling point/Decomposition temperature |
|---|---|---|
| monoethanolamine | 2 | bp 170°C |
| triethanolamine | 2 | bp 206°C |
| ammoniumsulphate | 1 | dt 230–350°C ($\rightarrow NH_3 + NH_4HSO_1$) |
| urea | 0.25 | dt* ($\rightarrow 2NH_3 + CO_2$) |

*the decomposition temperature is the temperature at the prevailing pressure in the extruder The examples referred to above disclose the surprising reaction mechanism causing the apparently paradoxical pattern of behaviour. The decomposition of especially ammonium sulphate (under emission of ammonia) cannot be conditioned by the relatively low working temperature in the extruder; according to example 4 this temperature was 170°C. According to the invention the reason is instead assumed to be overheating caused by friction in the contact surface between the melt and the working surfaces and restricted to local spots. At the same time this will account for the thermal degradation of wood particles within these areas. The acetic acid formed in this way is volatilized (at least partly) in the very thin gaseous phase between the extrusion melt and the working surfaces. The neutralization of this acetic acid can be brought about only by addition of volatile neutralizers which may join the gaseous phase, and not by addition of the conventional non-volatile additives that the melt will usually contain.

Of all substances dissociating ammonium, urea occupies a special position since when decomposed it will not leave any residue. Owing to the high molecular weight and the large content of ammonia the quantity of the additive required for neutralization is less than for the other substances in the table above (0.25 parts by weight). Ammonium salts, together with ammonia, will always form acidic residues. Ammonium carbonate will decompose already at a temperature of 60°C and is therefore less advantageous for use in connection with the method according to the invention.

In principle, instead of adding volatile additives to the mixture, neutralization may be brought about by allowing ammonia gas or ammonia gas diluted with a stream of nitrogen through the extruder or the injection moulding machine. However, this will require a complicated feeding device which must not be obstructed by the mixture and which must prevent the gas from streaming backwards through the machine, i.e. technical measures which are unreasonably expensive in comparison with the simple neutraliation, especially by using urea.

A further example of the invention will be given, concerning a mixture containing acrylonitrile-butadiene-styrene resin (ABS resin). Such a mixture will behave in a similar way as a mixture with polystyrene.

EXAMPLE 6

| | |
|---|---|
| Acrylonitrile-butadiene-styrene resin (ABS resin) | 100 parts by weight |
| Wood flour | 50 parts by weight |
| Urea | 0.5 parts by weight |

In this case, too, the condensate proved alkaline, whereas it proved acidic if the addition of urea was omitted.

What we claim is:

1. A method of preventing corrosion and wear caused by corrosion in connection with extrusion of a mixture comprising a member selected from the group consisting of polyvinyl chloride, polystyrene and acrylonitrile-butadiene-styrene resins and particulate cellulosic material which comprises effecting the extrusion in the presence of at least one gaseous alkaline compound, in order to neutralize acidic gaseous matter originating from the cellulosic material.

2. A method according to claim 1, in which the gaseous alkaline compound is added in gaseous form.

3. A method according to claim 1, in which the gaseous alkaline compound is formed in situ in the extruder by volatilization of an additive to the mixture.

4. A method according to claim 3, in which the gaseous alkaline compound is an organic amine.

5. A method according to claim 1, in which the gaseous alkaline compound is formed in the extruder by thermal degradation of an additive to the mixture.

6. A method according to claim 5, in which the additive comprises an ammonium salt.

7. A method according to claim 5, in which the additive comprises urea.

* * * * *